United States Patent
Murphy, Jr. et al.

[11] Patent Number: 5,397,632
[45] Date of Patent: Mar. 14, 1995

[54] NONWOVEN LAMINATED COMPOSITE ARTICLE CAPABLE OR READILY UNDERGOING PLEATING TO FORM A STABLE PLEATED DEPTH GASEOUS FILTRATION MEDIUM

[75] Inventors: William F. Murphy, Jr., Wilmington, Del.; Randy E. Powell, Mount Juliet, Tenn.

[73] Assignee: Reemay, Inc., Old Hickory, Tenn.

[21] Appl. No.: 61,368

[22] Filed: May 14, 1993

[51] Int. Cl.⁶ .................... B32B 7/02; B32B 27/34; B32B 5/06
[52] U.S. Cl. ...................... 428/284; 428/286; 428/290; 428/287; 428/296; 428/219; 428/213; 428/220; 428/302; 428/181; 428/102; 428/300; 55/385.3; 55/521
[58] Field of Search ............. 428/284, 286, 288, 287, 428/212, 213, 218, 296, 302, 409

[56] References Cited

U.S. PATENT DOCUMENTS

| | | | |
|---|---|---|---|
| 4,181,513 | 1/1980 | Fukuda et al. | 55/316 |
| 4,424,248 | 1/1984 | Tesch et al. | 428/300 |
| 4,514,455 | 4/1985 | Hwang | 428/287 |
| 4,582,750 | 4/1986 | Lou et al. | 428/288 |
| 4,818,586 | 4/1989 | Smith et al. | 428/288 |
| 4,883,707 | 11/1989 | Newkirk | 428/287 |
| 5,178,932 | 1/1993 | Perkins et al. | 428/286 |

Primary Examiner—George F. Lesmes
Assistant Examiner—Kathryne E. Shelborne
Attorney, Agent, or Firm—Burns, Doane, Swecker & Mathis

[57] ABSTRACT

An improved nonwoven multi-layered composite article is provided that is well amenable to pleating and service as a depth gaseous filtration medium. The components utilized to form the multi-layered composite consist essentially of polyester continuous filaments and staple fibers (as described in detail hereafter) and are mechanically secured together by needle-punching. At least one surface is lightly resin coated following the needle-punching in order to impart additional stiffness to the overall nonwoven laminated composite. The resulting article is capable of readily undergoing pleating to form a pleated filtration medium. In a preferred embodiment the resulting composite is free of any component that is capable of substantial moisture retention thereby enhancing the stability and shape retention properties of the product over a broader range of operating conditions. Additionally, in a preferred embodiment an outer surface of the composite article has been subjected to a heat relaxation treatment prior to resin coating in order to reduce the size of needle holes and to enhance the particle arrestance and dust holding capacity of resulting article.

38 Claims, 2 Drawing Sheets

Fig.3

NONWOVEN LAMINATED COMPOSITE ARTICLE CAPABLE OR READILY UNDERGOING PLEATING TO FORM A STABLE PLEATED DEPTH GASEOUS FILTRATION MEDIUM

BACKGROUND OF THE INVENTION

Nonwoven filtration media for the removal of solid particulate matter from gases have been proposed in the past and are commercially available. The most common nonwoven filtration medium produced in the past has been of the surface type wherein the ingress of deleterious solid particles suspended in the gas undergoing treatment is precluded and such unwanted contamination is deposited at the surface of the filtration medium. Such a surface filtration medium has had the disadvantage of a limited life that often has necessitated replacement at somewhat frequent intervals particularly if a large concentration of solid particulate matter is encountered. Under such circumstances as solid particulate matter builds up exclusively at the surface of the filtration media, it eventually precludes the further passage of any substantial quantity of the gas that is being subjected to filtration.

In recent years the use of fuel-injection systems having close tolerances in conjunction with internal combustion engines has created additional demands for a relatively inexpensive disposable filtration medium that will perform well over a variety of environments to accomplish the substantial removal of solid particles of a wide range of sizes that are suspended in the air stream that is directed to the engine. Such severe filtration demands must also be balanced with a desire to extend the period of time between routine maintenance procedures and filter replacement. Accordingly, it has been proposed in the past to substitute in some instances the use of depth filtration media instead of surface filtration media. Such depth filtration media exhibit a more open three-dimensional internal structure to effectively trap the solid particles throughout the cross-section of the filtration medium rather than exclusively at the surface of the filtration medium.

The pleating of filtration media is recognized to increase the surface area within a given three-dimensional area and to thereby increase the useful life of the media. It further is recognized that resin impregnated paper filters when situated adjacent fuel-injected engines which operate at higher temperatures may become embrittled during usage in such environment.

In the past a multi-layered nonwoven pleated depth filtration medium for automotive applications having a thickness of approximately 106 mils has been available from Toyobo Co., Ltd. of Oska, Japan and Purodenso of Jackson, Tenn. Such filtration medium is believed to consist of a top layer of approximately 0.9 oz./yd.$^2$ polyvinyl alcohol staple fiber web, an intermediate layer of approximately 3 oz./yd.$^2$ polyethylene terephthalate staple fiber web, and a backside of approximately 2 oz./yd.$^2$ of a discontinuous cellulosic fiber paper or web. The three layers described above are needle-punched and the backside is coated with approximately 30 percent by weight based on the total weight of the filtration medium of an acrylate polymer. The pleatability of such filtration medium is understood to be influenced by variations in its moisture content. For instance, both the polyvinyl alcohol staple fibers and cellulosic fibers present therein have a tendency to retain a substantial quantity of water from the ambient atmosphere.

It is an object of the present invention to provide a nonwoven multi-layered composite article of the indicated structure that has been found to be well suited for service as a depth gaseous filtration medium.

It is an object of the present invention to provide a nonwoven multi-layered composite article of the indicated structure that is capable of readily undergoing pleating on a stable basis to form a pleated depth gaseous filtration medium while retaining permeability for gaseous filtration.

It is an object of the present invention to provide an improved nonwoven multi-layered composite article of the indicated structure that is stable in nature and is capable of efficient service for an extended period of time as a depth gaseous filtration medium.

It is an object of the present invention to provide a nonwoven multi-layered composite filtration medium that can exhibit an equivalent or superior dust holding capacity when compared to that being marketed by Toyobo Co., Ltd. and Purodenso while being of a lesser thickness thereby making possible or more efficient filtration medium per unit of cross-sectional area.

It is an object of the present invention to provide a non-woven multi-layered composite filtration medium that does not require the relatively high level resin coating employed in the product marketed by Toyobo Co., Ltd. and Purodenso.

It is another object of the present invention to provide an improved nonwoven multi-layered composite article of the indicated structure which is capable of no substantial moisture retention and is not influenced by changes in the relative humidity of the gas that passes therethrough.

It is a further object of the present invention to provide an automotive air filter that incorporates the pleated nonwoven composite article of the present invention therein.

These and other objects, as well as the scope, nature and utilization of the invention will be apparent to those skilled in the art from the following description and appended claims.

SUMMARY OF THE INVENTION

It has been found that an improved nonwoven laminated composite article capable of readily undergoing pleating to form a stable pleated depth gaseous filtration medium consists essentially of:
(a) an outer substantially fully bonded air-permeable continuous filament polyester web,
(b) an outer substantially fully bonded air-permeable high loft batt comprising a randomly-dispersed blend of crimped staple polyester fibers exhibiting at least two different deniers, and
(c) an intermediate substantially unbonded air-permeable continuous filament polyester web disposed between web (a) and bait (b), wherein components (a), (b), and (e) at intermittent locations are mechanically secured together in a juxtaposed surface-to-surface relationship through the use of needle-punching wherein needles having a fiber-advancing configuration have been introduced successively through bart (b), web (c), and web (a) prior to their withdrawal with the retention of substantial loft within web (b), and at least the outer surface of web (a) was lightly resin coat subsequent to said needle-punching while retaining permeability for gaseous filtration.

In a preferred embodiment the outer surface of web (a) subsequent to said needle-punching and prior to the resin coating has been subjected to a heat relaxation treatment in order to reduce the size of needle holes. The particle arrestance and dust holding capacity of the product are thereby enhanced. Also, in a preferred embodiment no component capable of substantial moisture retention is present within the composite article.

An improved automotive depth air filter is made possible wherein the nonwoven composite article of the present invention while in pleated form is secured within a casing.

DESCRIPTION OF PREFERRED EMBODIMENTS

The nonwoven laminated composite article of the present invention is capable of readily undergoing pleating on a stable and uniform basis without any substantial modification of its permeability to air and consists essentially of three discrete layers or plies that are mechanically united (as described hereafter) in a juxtaposed surface-to-surface relationship. Additionally, it is essential that a resin coating be lightly applied to at least the exposed backside of the resulting laminate (as described hereafter) in order to impart additional stiffness to the overall nonwoven laminated composite article while retaining the permeability required for gaseous filtration.

Each of the webs, layers, or plies of the composite article of the present invention is formed primarily of a fibrous polyester which inherently exhibits no substantial moisture retention. For instance, when exposed to the atmosphere, such fibers inherently will absorb on their surfaces no more than approximately one percent by weight moisture, and preferably no more than approximately 0.5 percent by weight moisture. It is recommended that the polyester exhibit a softening temperature of at least 180° C. and melting temperature of at least 250° C. so that it is well capable of undergoing pleating with the application of heat as described hereafter without causing any substantial fusion or other significant modification of the continuous filaments and staple fibers present therein. Such polyesters are capable of undergoing melt extrusion to form fibers and commonly are obtained from an aromatic dicarboxylic acid (e.g., terephthalic acid, isophthalic acid, naphthalene dicarboxylic acid, etc.) and an alkylene glycol (e.g., ethylene glycol, propylene glycol, etc.) as the diol component. In a preferred embodiment the polyester comprises at least 85 mole percent of polyethylene terephthalate. As the polyester fibers are melt extruded during fiber formation they optionally may be blended with approximately 5 to 20 percent by weight of similarly melt-extruded binder fibers, such as polyethylene isophthalate fibers, etc. Such binder fibers preferably melt at a temperature approximately 40° to 50° C. lower than the melting temperature of the polyester that consists substantially exclusively of recurring polyethylene terephthalate units. Alternatively, the fibers of the various layers at the time of their formation can be provided with a sheath or other adjacent component to provide bi-component fibers having a component that exhibits a lesser softening or melting temperature which ultimately serves a binding function.

In a preferred embodiment no component is utilized in any of the webs of the composite article that is capable of substantial moisture retention, i.e., a moisture retention of more than 2 percent by weight when exposed to a humid atmosphere at ambient conditions. Accordingly, no polyvinyl alcohol and/or cellulosic fibers are utilized which would inherently absorb considerably more water and would tend to modify the physical properties of the resulting composite article depending upon the relative humidity being experienced. Accordingly, the level of moisture retention exhibited by polyvinyl alcohol and/or cellulosic fibers is absent. Such excessive moisture retention could deleteriously impact upon the stiffness and pleatability of the resulting composite article as well as its filtration ability since the polyvinyl alcohol and/or cellulosic fibers may absorb substantial moisture thereby rendering such fibers somewhat thicker and longer. When this occurs, variations can occur in the fibrous network of the filtration medium that may impart instability and may influence the ability to undergo pleating and the filtration capacity thereof as a result of uncontrollable humidity changes in the environment. The polyester fibers utilized in the present invention do not swell when exposed to humid ambient conditions and the requisite stiffness for optimum pleatability is well retained.

The outer backside web that is utilized in the construction of the composite article of the present invention is a substantially fully bonded air-permeable continuous filament polyester nonwoven web. This commonly is a substantially random web which exhibits substantially isotropic properties that are nondirectional in nature. The continuous polyester filaments thereof are bonded to each other at points of contact (i.e., at cross-over points) with the retention of the requisite permeability to gases. The web is considered to be substantially fully bonded in the sense that the filaments are bonded together at a multitude of cross-over points as can be confirmed through microscopic examination. The bonding at substantially all cross-over points among the continuous filaments within the web can be accomplished by any convenient means, such as by the melting of binder fibers, resin bonding, thermal area bonding, calendering, point bonding, ultrasonic bonding, etc. In a preferred embodiment the melting of lower softening temperature binder fibers is utilized. The continuous filaments of such web preferably have a denier per filament of approximately 2 to 5 (e.g., approximately 4). Additionally, such web prior to incorporation in the composite article of the present invention commonly has a thickness of approximately 15 to 25 mils (preferably approximately 22 to 24 mils), and a unit weight of approximately 3 to 5 oz./yd.$^2$ (e.g., approximately 4 oz./yd.$^2$). In the nonwoven composite article of the present invention it has been found that this web performs well as a support for the upper layers or plies (described hereafter) as well as a final filtration medium.

The intermediate web that is utilized in the construction of the composite article of the present invention is a substantially unbonded air-permeable continuous filament polyester web. This commonly is a substantially random web which exhibits substantially isotropic properties that are nondirectional in nature and the continuous polyester filaments thereof are merely consolidated without any substantial bonding at cross-over points. The consolidation can be accomplished by any convenient means, such as through the application of pressure at a mildly elevated temperature well below the softening temperature of the filaments. The substantial absence of bonding among adjoining filaments can be confirmed through microscopic examination. The continuous filaments of such web in view of the substantial absence of bonding at cross-over points exhibit considerable mobility within the fibrous web and preferably have a denier per filament of approximately 1.5 to 4 (e.g., approximately 2.2). Additionally, such web prior to incorporation in the composite article of the present invention commonly has a thickness of approximately 4 to 8 mils (preferably approximately 5 to 6 mils), and a unit weight of approximately 0.75 to 2 oz./yd.$^2$ (e.g., approximately 1 oz./yd.$^2$). In the nonwoven composite of the present invention the intermediate web has been found to well serve a hole-blocking function following needle-punching in view of the relative mobility of the filaments present therein as well as provides an intermediate filtration medium in the nonwoven laminated composite article.

The top web that is utilized in the construction of the composite article of the present invention is a fully bonded air-permeable high loft polyester bart comprising a randomly-dispersed blend of crimped staple fibers exhibiting at least two different fiber deniers. The staple fiber web is considered to be high loft in the sense that it possesses a high void volume between fibers as evidenced by substantial resiliency following compression. The staple polyester fibers of such blend commonly exhibit lengths of approximately 1 to 3 inches (e.g., approximately 2 inches) and are rendered wavy or crimped by conventional means such as by the use of gear-tooth crimper or other mechanical crimpers that are well known in the art. In a preferred embodiment one of the deniers exhibited by the crimped staple polyester fibers is within the range of approximately 4 to 8 (e.g., approximately 6) and another of the deniers is within the range of approximately 12 to 18 (e.g., approximately 15). The staple polyester fiber batt is considered to be fully bonded in the sense that the staple fibers are bonded together at substantially all points of contact (i.e., cross-over points) as can be confirmed through microscopic examination. The bonding between staple adjoining crimped fibers can be accomplished by any convenient means, such as by resin bonding, the melting of binder fibers, thermal area bonding, calendering, point bonding, ultrasonic bonding, etc., with care being taken to preserve the high loft character of the batt. In a preferred embodiment resin bonding is utilized with an uncured resin being lightly applied from an aqueous emulsion or .dispersion so as to permeate the entire batt prior to thermal treatment in which curing is accomplished. Such staple fiber batt prior to incorporation in the composite article of the present invention commonly has a substantial thickness of approximately 40 to 80 mils (preferably approximately 65 to 75 mils), and a unit weight of approximately 1 to 4 oz./yd.$^2$ (e.g., approximately 3 oz./yd.$^2$). A particularly preferred primarily polyethylene terephthalate batt is formed through resin bonding with the use of an acrylate resin, has a thickness of approximately 70 mils, has a unit weight of approximately 3 oz./yd.$^2$, and is composed of crimped staple fibers having a length of approximately 2 inches wherein approximately 60 percent by weight of the fibers have a denier of approximately 6 and approximately 40 percent by weight of the fibers have a denier of approximately 15. A suitable resin bonded air-permeable high loft polyester batt for use in the composite article of the present invention is commercially available from Cardel Fabrics of Salisbury, N.C., under the S-235 designation. In the nonwoven composite article of the present invention a substantial portion of depth filtration occurs within this staple fiber batt. The crimped nature of staple fibers within the blend and their different deniers serves to well preserve the desired high loft character. It is through this staple fiber batt that the air undergoing filtration initially passes. The high loft character of such batt and the presence of crimped staple fibers exhibiting at least two different deniers provides numerous interstices for the entrapment of solid particulates of varying sizes without substantial diminution of the gas flow through the composite article. Accordingly, the useful life of the resulting composite article is substantially extended over that of a surface filtration medium.

The various nonwoven layers while in juxtaposed surface-to-surface contact in the arrangement discussed and illustrated herein are mechanically secured at intermittent locations through the use of needle-punching (sometimes termed "needle-felting"). During such needle-punching a plurality of needles having a fiber-advancing configuration are passed through all layers. The needles initially enter the top batt containing the randomly dispersed blend of crimped staple polyester fibers. The needles next pass through the intermediate web of substantially unbonded continuous polyester filaments, and finally through the outer backside web of fully-bonded continuous polyester filaments. During such needle insertion and withdrawal, staple fibers from top batt and relatively mobile continuous filaments from the intermediate web are driven forward and into the outer backside web. The needles utilized are of blunt, barbed or forked configurations adapted to engage the staple fibers and filaments they contact and to move a portion thereof forward and into the outer backside web while retaining substantial loft in the top web of crimped staple polyester fibers having at least two different deniers. Needle-punching is a known technique and is disclosed for example in U.S. Pat. Nos. 4,424,248, 4,582,750, and 4,818,586, which are herein incorporated by reference. The various webs become mechanically interconnected and interlocked through the entanglement of staple fibers and filaments during such needle-punching operation. Particularly good results have been obtained at a penetration frequency of approximately 200 to 500 penetrations per square inch, and preferably at a penetration frequency of approximately 250 to 350 penetrations per square inch (e.g., approximately 300 penetrations per square inch). Particularly good results have been achieved while utilizing 38 gauge needles having 3 barbs per needle, and 40 gauge needles having 9 barbs per needle. The needle-punch conditions are adjusted so as to retain substantial loft within the staple fiber batt and to provide the requisite bulk for good dust holding capacity. As the dust holding capacity of the resulting composite article increases, so does its useful life as a filtration medium.

As indicated, substantial loft is retained in the batt comprising the crimped staple polyester fibers following the uniting of the respective layers by needle-punching. More specifically, approximately 90 to 100 percent of the original thickness of the crimped staple polyester batt prior to needle-punching continues to be exhibited following needle-punching.

The overall nonwoven laminate following needle-punching commonly exhibits a thickness of approximately 80 to 150 mils, and preferably a thickness of approximately 90 to 115 mils as determined in accordance with ASTM D-1777.

Subsequent to the uniting of the respective webs by needle-punching, at least the outer surface of the substantially fully bonded air-permeable continuous filament polyester web is lightly resin coated in order to impart additional stiffness to the overall nonwoven laminated composite article while retaining the requisite permeability for gaseous filtration. In a preferred embodiment the staple fiber batt portion of the composite article additionally is lightly resin coated following needle-punching in order to impart additional stiffness and to minimize the possibility of fiber loss during filtration as the result of surface fuzzing. The resin coating also commonly will penetrate to at least some degree throughout the staple fiber batt and thereby will tend to retard any delamination of the respective layers during use. The resin coating commonly is applied in a total concentration of no more than approximately 15 percent by weight based upon the total weight of the composite article (e.g., approximately 6 to 12 percent by weight based upon the total weight of the composite article), and preferably in a concentration of approximately 9 percent by weight of the composite article. Such resin coating advantageously can be applied from an aqueous emulsion or dispersion of the resin that subsequently is cured following the evolution of the aqueous medium. The resin coating conveniently can be applied through the use of known techniques, such as knife coating, spraying, dipping, etc. In a preferred embodiment the resin coating is applied to the outer surface of the continuous filament polyester web while in relatively viscous form through the use of a knife coater. Also, in a preferred embodiment the resin emulsion or dispersion is applied to the staple fiber batt portion of the web while relatively non-viscous through spraying. Such an application of a non-viscous spray enables the resin to readily flow throughout the staple fiber batt prior to curing. In a preferred embodiment the resin employed for the coating is an acrylate resin that is capable of undergoing crosslinking and is introduced with a conventional catalyst or accelerator to aid in the crosslinking reaction. Representative acrylate resins include thermosetting acrylic surface coating resins such as 2-hydroxyethyl acrylate, hydroxypropyl acrylate, an ethylacrylate-itaconic acid-methyl methacrylate copolymer, etc. A particularly preferred acrylate resin is available from Rohm and Haas Co. under the Rhoplex TR-407 designation. A minor quantity of a polymeric stiffening agent such as an uncured melamine-formaldehyde resin optionally may be included in the coating composition as well as a conventional defoamer. When the resin coating is applied to the outer surface of the continuous filament polyester web by knife coating, an alkali-soluble and/or alkali-swellable acrylic polymer optionally can be included in the aqueous dispersion from which it is applied in an effective minor concentration with pH adjustment through the addition of a base, such as sodium or ammonium hydroxide, so as to render the overall acrylate coating more viscous at the time of its application. The additional stiffness provided by the resin coating is beneficial during the pleating operation described hereafter and better enables the resulting laminate to retain a stable pleated configuration during its service as a filtration medium. Additionally, the resin coating serves to partially seal the surface of the outer backside web and to advantageously modify the gaseous permeability of the overall laminate. For instance, the gaseous permeability of the laminate in $ft.^3/min./ft.^2$ at a pressure of 0.5 inch $H_2O$ commonly is reduced by approximately 25 to 60 percent following such resin coating when measured in accordance with ASTM D-737. Since a very light resin coating preferably is applied (as described), the cost of laminated composite article production is minimized through the utilization of a relatively small quantity of coating resin, and the product formation procedure is simplified.

In a preferred embodiment the exposed surface of the continuous filament polyester web of the laminate intermediate the needle-punching and the light coating with a resin (as described above) is subjected to a heat relaxation treatment wherein the permeability thereof to gases is further diminished. The optional heat relaxation step has been found to render the surface of the composite article more uniform and thereby imparts added reliability to the service of the laminate as a gaseous filtration medium. During such heat relaxation step a slight shrinkage of the fibrous network takes place which causes the polyester filaments primarily upon the surface to increase slightly in diameter and to thereby close to a small but significant degree interstices within the fibrous network. Holes resulting from the needle-punch operation also tend to be closed to at least a limited degree as the staple fibers and substantially unbonded continuous filaments of the intermediate layer seek to return to their original deployment prior to such needle-punching. Induced stresses that were introduced during the needle-punching operation tend to be relieved. The heat relaxation step can be carried out by briefly heating the requisite exposed surface of the composite to a temperature below the softening temperature of the polyester fibrous components (e.g., polyethylene terephthalate components) thereof. However, the temperature employed during the heat relaxation step may be sufficiently high as to cause the softening of any residual binder polymer (e.g., that is derived from polyethylene isophthalate fibers) present therein. This can further lead to fusion bonding to at least some degree of the filaments present in the intermediate zone and fusion bonding between adjoining layers to at least some degree and accordingly can impart an improvement in the delamination resistance of the overall composite article. The optional heat relaxation step can be carried out by passing the composite through a heat tunnel, under quartz lamps, under infrared lamps, under a flame, in contact with a heated burnishing roll, etc. In a preferred embodiment the heat relaxation step is carried out by passing the laminate immediately following needle-punching and prior to the application of the light resin coating in contact with a heated steel roll having a smooth surface that is rotated in the direction opposite to that of the moving laminate. Contact between the heated rotating burnishing roll and the moving laminated composite article can be aided by increasing the wrap angle. The thickness and loft of the composite article commonly is not altered to any significant degree by such heat relaxation step.

The resulting surface-coated nonwoven laminated composite article of the present invention commonly exhibits an overall thickness of approximately 75 to 115 mils and preferably a thickness of approximately 80 to 105 (e.g., approximately 85 mils). Such thickness can be measured in accordance with ASTM D-1777.

The resulting nonwoven laminated composite article of the present invention commonly exhibits an overall unit weight of approximately 4 to 12 oz./yd.$^2$, and preferably a unit weight of approximately 5 to 10 oz./yd.$^2$ (e.g., approximately 9 oz./yd.$^2$). Such unit weight can be measured in accordance with ASTM D-3776-79.

The resulting nonwoven laminated composite article of the present invention commonly exhibits a sheet grab tensile modulus in the machine direction of at least approximately 60 lbs. (e.g., approximately 60 to 100 lbs.), and sheet grab tensile modulus in the transverse direction of approximately 40 to 80 lbs. Such sheet grab tensile modulus values can be measured in accordance with ASTM D-1682. It has been found that if the sheet grab tensile modulus in the machine direction is much below 60 lbs., the composite sometimes will tend to buckle and will not reliably pleat when pleating is attempted. Also, if the sheet grab tensile modulus in the machine direction is much above 100 lbs., the composite sometimes will tend to break and will not bend uniformly when pleating is attempted.

The resulting nonwoven laminated composite article of the present invention commonly exhibits an air permeability of approximately 80 to 150 ft.$^3$/min./ft.$^2$ at a pressure of 0.5 inch H$_2$O, and preferably an air permeability of approximately 90 to 115 ft$^3$/min./ft.$^2$ at a pressure of 0.5 inch H$_2$O. Such air permeability can be measured in accordance with ASTM D-737.

The resulting nonwoven laminated composite article of the present invention commonly exhibits an elongation at break of approximately 25 to 50 percent. Such elongation value can be measured in accordance with ASTM D-1682.

Figure 3:
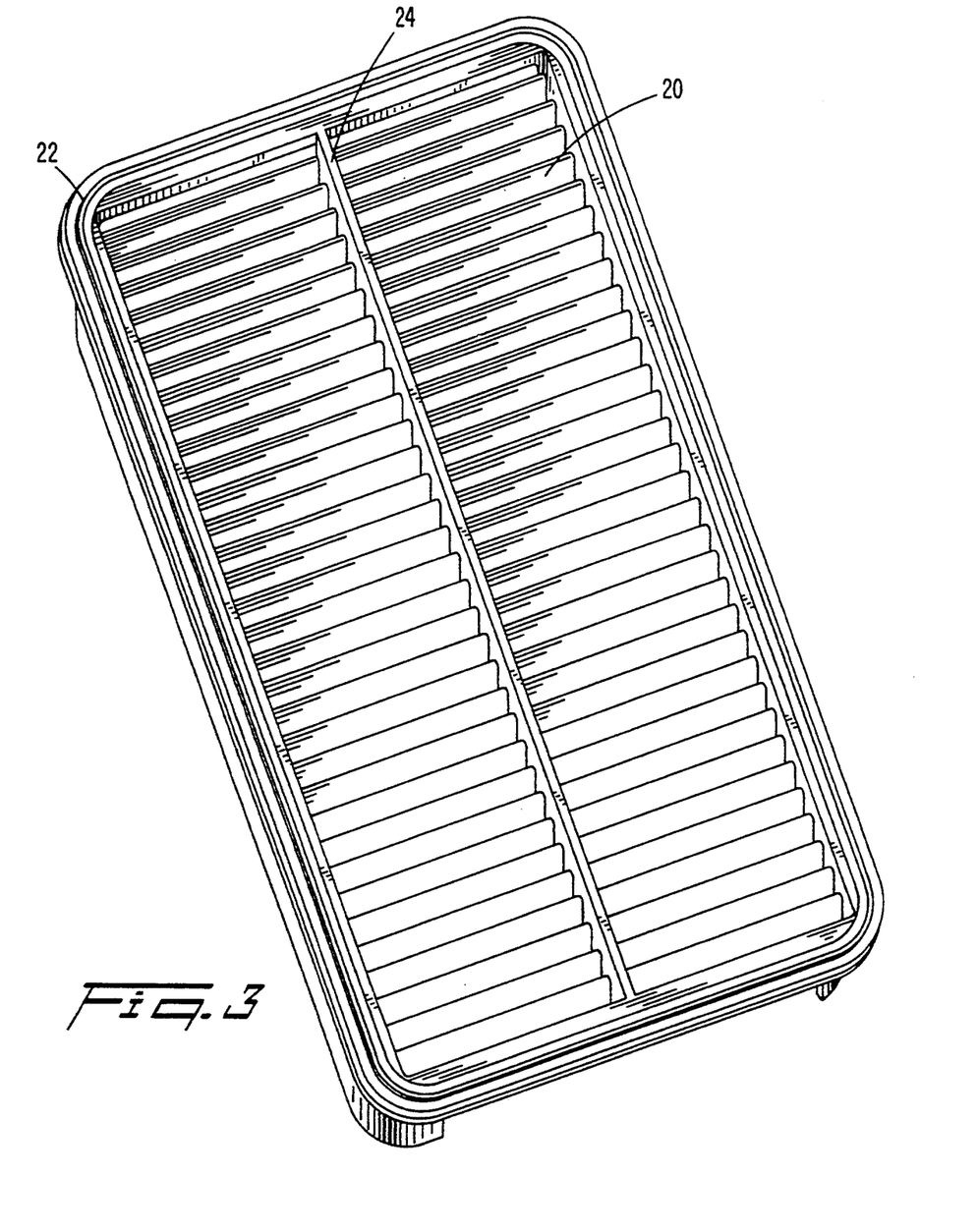
FIG. 3 illustrates a perspective view of a representative depth automotive air filter wherein the nonwoven laminated composite article of the present invention while in pleated form is secured within an injection-molded polymeric casing.

The resulting nonwoven laminated composite article of the present invention when present in an automotive air filter as illustrated in FIG. 3 commonly exhibits a dust holding capacity in accordance with SAE J726 of at least 140 grams, and preferably at least 200 grams while operating at substantially full efficiency.

The resulting nonwoven laminated composite article of the present invention commonly exhibits a particle arrestance in accordance with SAE J726 while using a standard AC Fine dust or PTI Fine dust of at least 96 percent for all particle sizes generally within the range of 1.5 to 10 microns, and preferably of at least 98 percent for all particle sizes within such range.

The nonwoven laminated composite article of the present invention is capable of readily undergoing pleating by the application of heat and contact with an appropriate form without any substantial modification of its air permeability characteristics. Such pleating enables the placement of a significantly larger quantity of the composite article within a given area during filtration thereby making possible the exposure of a greater surface area of the filtration medium to the gas that is undergoing filtration. Such larger surface area facilitates a significantly longer service life for the filtration medium. In a preferred embodiment, the laminate is pleated to form a series of recurring substantially uniform U-shaped or V-shaped undulations. The pleating can be carded out through the utilization of known pleating techniques heretofore utilized with nonwovens and papers. For instance, the pleating may be carded out by the use of a Chandler pleater available from Chandler Machine Co. of Ayer, Mass.

The pleated nonwoven laminated composite article can be secured within a casing to form an automotive depth air filter. For instance, the casing can be injection molded around a segment of the pleated composite article so that all edges of the laminate are secured within the walls of the casing. Any thermoplastic polymeric material capable of being melt processed to form a container of adequate strength and durability may be selected, such as polypropylene, polyethylene, polybutylene terephthalate, etc., with polypropylene being preferred. Alternatively, the nonwoven laminated composite article of the present invention can be secured within a preformed casing (e.g., a polymeric or metallic casing) by use of an adhesive that well seals all of its edges. The configuration of the pleated laminate within the casing can be varied. For example, it optionally can be provided in a circular or spiral form in addition to the rectangular configuration that is illustrated in the drawings.

The following example is provided as a specific illustration of the invention. It should be understood, however, that the invention is not limited to the specific details set forth in the example. Reference is made to product illustrated in the drawings.

EXAMPLE

Figure 1:
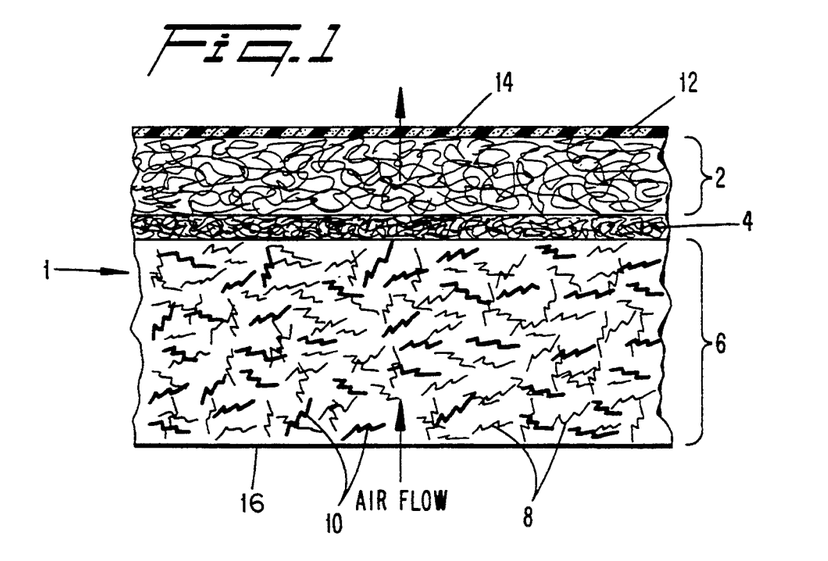
FIG. 1 illustrates an enlarged cross-sectional view of a portion of representative nonwoven laminated composite article of the present invention wherein the arrows indicate the direction of flow of the gaseous medium when passed therethrough while undergoing filtration to remove solid particulate matter suspended therein.

As previously indicated, FIG. 1 illustrates an enlarged cross-sectional view of a portion of a nonwoven laminated composite article 1 of the present invention. Such article is composed of three preformed nonwoven layers with resin coatings as described hereafter. The continuous filaments of the nonwoven web 2 were composed of polyethylene terephthalate and were thermal bonded at cross-over points through the use of approximately 10 percent by weight of melt-extruded binder fibers consisting of a polyethylene isophthalate. The continuous filaments of web 4 were similarly composed of polyethylene terephthalate and approximately 10 percent by weight of melt-extruded fibers consisting of polyethylene isophthalate which were substantially unmelted and served no substantial binder function. The staple fibers of the high loft bart 6 were also polyethylene terephthalate, and were bonded through the use of a resin bonding emulsion.

The outer backside web 2 was a random isotropic continuous filament fully bonded air-permeable web obtained from Reemay Inc. of Old Hickory, Tenn. as Style 2040. Prior to needle-punching, it possessed a thickness of approximately 23 mils, was formed by the thermal area bonding of 4 denier continuous filaments, and possessed a unit weight of 4 oz./yd.$^2$ The intermediate substantially unbonded air-permeable random continuous filament web 4 was obtained from Reemay Inc. as Style T-503. This was a consolidated web. Prior to needle-punching, it possessed a thickness of approximately 5 mils, was formed by consolidation with pressure (i.e., pressure tacking) in the substantial absence of bonding at cross-over points, was formed of 2.2 denier continuous filaments, and possessed a unit weight of 1 oz./yd.$^2$ A substantial portion of the adjoining filaments remained unbonded at crossover points as evidenced by microscopic examination showing that all fibers including the polyethylene isophthalate fibers remain substantially unmelted.

The top batt 6 (i.e., the top layer in the sense that the gas undergoing filtration enters here) was a fully bonded air-permeable high loft batt comprising a blend of randomly-dispersed crimped staple fibers and was obtained from Cardel Fabrics of Salisbury, N.C., under the S-235 designation. The staple fibers were bonded at cross-over points through the use of an acrylate bonding resin that was applied from a liquid throughout the batt prior to curing. Prior to needle-punching, the batt possessed a thickness of approximately 70 mils, possessed many interstices between the crimped staple fibers, and was formed from crimped staple fibers having lengths of approximately 2 inches wherein approximately 60 percent by weight of the crimped staple fibers 8 were of 6 denier, and approximately 40 percent by weight of the crimped staple fibers 10 were of 15 denier.

When the three layers were stacked as illustrated, they were needle punched at a rate of 300 penetrations per square inch while utilizing 38 gauge needles having 3 barbs per needle. A Fehrer needle loom having the NL 21 designation was utilized. The needle loom was adjusted for a 9 mil penetration, a 1075 rpm loom speed, and a ½ inch gap, while the stack of nonwoven layers moved at a rate of approximately 60 feet per minute beneath the needles. The needles passed successively through layers 6, 4, and 2 and were withdrawn from the surface of batt 6. During the course of the needle-punch operation staple fibers from batt 6 and the relatively mobile continuous filaments of web 4 were driven forward at the locations where the needles penetrated and facilitated the mechanical uniting of the three layers through entanglement at intermittent locations. The needle-punch operation resulted in no substantial diminution of the loft of batt 6 thereby well preserving the numerous interstices of varying sizes between adjoining crimped staple fibers. The overall nonwoven laminate following needle-punching exhibited a thickness of approximately 100 mils.

The exposed surface 14 of web 2 next was contacted with the surface of a heated rotating smooth-surfaced steel roll (not illustrated) in order to impart heat relaxation. While the composite article was advanced, its surface was contacted with the heated steel roll by means of tension while the roll was maintained at a temperature of approximately 193° C. and was rotated in the direction opposite to the movement of the laminated composite. The gaseous permeability of the composite article 1 was diminished by such surface burnishing, and the thickness and loft of the composite article was not altered to any significant degree as a result of such heat relaxation treatment.

The exposed surface of web 2 of the nonwoven laminate was lightly coated with a layer 12 consisting primarily of a crosslinkable acrylate resin that was commercially available from Rohm and Haas Co. under the Rhoplex TR-407 designation by means of knife coater. The acrylate resin was applied to the surface of web 2 from a viscous aqueous dispersion that contained approximately 23 percent resin by weight together with 1.6 percent by weight of melamine-formaldehyde resin (M-3) that served a stiffening function in the resulting composite article, and minor concentrations of catalyst (DA-2) to facilitate crosslinking, defoamer, and alkali-soluble (ASE-60) and alkali-swellable CIT-615) acrylic polymers effective to raise the viscosity of the overall dispersion upon the addition of sodium hydroxide to facilitate efficient application through the use of the knife coater. The exposed surface 16 of staple batt 6 was sprayed lightly with a second relatively non-viscous aqueous dispersion of the Rhoplex TR-407 acrylate resin. The Rhoplex TR-407 acrylate resin was present in the dispersion in a concentration of approximately 67 per cent by weight together with 4.3 percent by weight of melamine-formaldehyde resin (M-3) that served a stiffening function in the resulting composite article, as were minor concentrations of catalyst (DA-2), and defoamer. The dispersion tended to pass throughout staple fiber batt 6 prior to curing. The resin coatings were cured in hot air and the water component was volatized. Since the resin composition was relatively non-viscous and was applied to batt 6 by spraying, it became substantially dispersed throughout batt 6 and is not illustrated in FIG. 1. The two resin coatings were applied in substantially equal amounts by weight and imparted additional stiffness to the laminated composite article with the retention of the requisite gaseous permeability needed for gaseous filtration.

The resulting resin-coated nonwoven laminated composite article 1 exhibited an overall thickness of approximately 85 mils as determined in accordance with ASTM D-1777, an overall unit weight of approximately 9 oz./yd.$^2$ as determined in accordance with ASTM D-3776-79, a sheet grab tensile modulus in the machine direction of 80 lbs. as determined in accordance with ASTM D-1682, a sheet grab tensile modulus in the transverse direction of 60 lbs. as determined in accordance with ASTM D-1682, an elongation of 40 percent in the machine direction and 45 percent in the cross-direction as determined in accordance with ASTM D-1682, and an air permeability of approximately 100 ft.$^3$/min./ft.$^2$ at a pressure of 0.5 inch H$_2$O.

Figure 2:
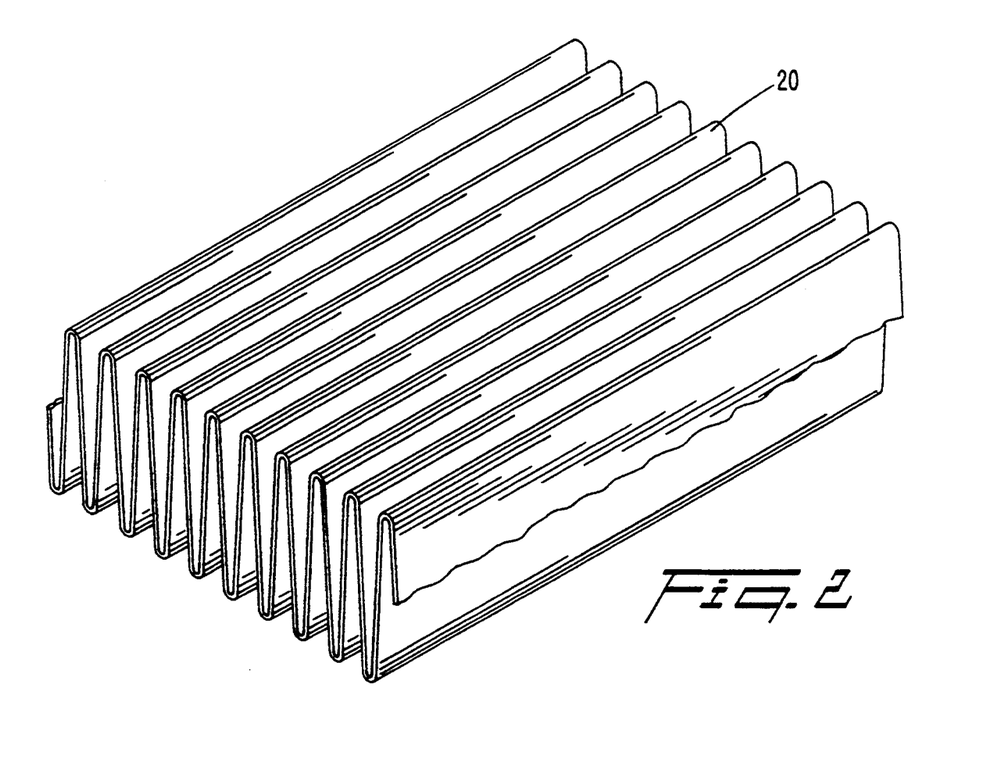
FIG. 2 illustrates a perspective view of a portion of a representative nonwoven laminated composite article of the present invention when pleated in a substantially U-shaped configuration.

The resin-coated nonwoven laminated composite article next was pleated to assume the configuration of recurring substantially uniform U-shaped undulations 20 as illustrated in FIG. 2. The undulations were created while passing at a rate 10 to 15 feet per minute through a Chandler pleater operating at 250° F. The pleating was carried out without any substantial modification of the air permeability characteristics of the nonwoven laminated composite article.

A segment of the pleated nonwoven laminated composite article 20 as illustrated in FIG. 3 next was secured within polypropylene casing 22 that was formed by injection molding. The casing 22 included a central partition 24 that simultaneously was formed about the pleated undulations 20 during such injection molding. The exposed edges of the pleated nonwoven laminated composite article 20 were sealed within the plastic casing 22 in an impervious manner at the time of its formation. Such encasement of the pleated nonwoven 20 of the present invention was carried out in a manner identical to that utilized by Toyobo Co., Ltd. and Purodenso as described in the Background of the Invention in conjunction with a different filtration medium. During use as an automotive air filter, the ambient air which may contains deleterious solid particulate matter enters the exposed surface illustrated in FIG. 3 and passes downwardly therethrough to the air intake of an internal combustion engine.

The dust holding capacity of automotive air filters of FIG. 3 having 33 pleats was tested in accordance with SAE J726 employing a standard PTI Fine dust sample No. 4422B. The dust was introduced while suspended in air at a rate of 5.1 g./min. with air flowing at 180 standard ft.$^3$/min. It was found that an average of 241.2 grams of dust were retained in the filter while operating at substantially full efficiency with a standard deviation between filters of 3.688 grams.

The particle arrestance of the automotive air filter of FIG. 3 having 33 pleats was tested in accordance with SAE J726 employing a 60 cc. sample of standard AC Fine dust having particle sizes generally within the range of 1.5 to 10 microns. The dust was constantly introduced at an air flow rate of 100 standard ft.$^3$/min. The initial efficiency of the filter for the various particle sizes is reported below.

|  | 1.5 to 2 microns | 2 to 3 microns | 3 to 5 microns | 5 to 7 microns | 7 to 10 microns | >10 microns |
|---|---|---|---|---|---|---|
| Initial Efficiency (percent) | 98.57 | 98.97 | 99.35 | 99.58 | 99.06 | 99.54 |

It will be noted that Automotive air filter of the present invention has been found to be particularly effective in the arrestance of larger-sized particles which carry the propensity to cause more severe damage to an internal combustion engine.

Although the invention has been described with a preferred embodiment, it is to be understood that variations and modifications may be resorted as will be apparent to those skilled in the art. Such variations and modifications are to be considered within the purview and scope of the claims appended hereto.

We claim:

1. An improved nonwoven laminated composite article capable of readily undergoing pleating to form a pleated depth gaseous filtration medium consisting essentially of:
   (a) an outer substantially fully bonded air-permeable continuous filament polyester web,
   (b) an outer substantially fully bonded air-permeable high loft batt comprising a randomly-dispersed blend of crimped staple polyester fibers exhibiting at least two different deniers, and
   (c) an intermediate substantially unbonded air-permeable continuous filament polyester web disposed between web (a) and batt (b),
wherein said components (a), (b), and (c) at intermittent locations are mechanically secured together in a juxtaposed surface-to-surface relationship through the use of needle-punching wherein needles having a fiber-advancing configuration have been introduced successively through batt (b), web (c), and web (a) prior to their withdrawal with the retention of substantial loft within batt (b), and at least the outer surface of web (a) was lightly resin coated subsequent to said needle-punching while retaining permeability for gaseous filtration.

2. An improved nonwoven laminated composite article capable of readily undergoing pleating according to claim 1 wherein said polyester of batt (b) and webs (a) and (c) contains at least 85 mole percent of polyethylene terephthalate.

3. An improved nonwoven laminated composite article capable of readily undergoing pleating according to claim 1 wherein no component capable of substantial moisture retention is present.

4. An improved nonwoven laminated composite article capable of readily undergoing pleating according to claim 1 having a thickness of approximately 75 to 115 mils and a unit weight of approximately 4 to 12 oz./yd.$^2$.

5. An improved nonwoven laminated composite article capable of readily undergoing pleating according to claim 1 having a sheet grab tensile modulus in the machine direction of approximately 60 to 100 lbs.

6. An improved nonwoven laminated composite article capable of readily undergoing pleating according to claim 1 having an air permeability of approximately 80 to 150 ft.$^3$/min./ft.$^2$ at a pressure of 0.5 inch H$_2$O.

7. An improved nonwoven laminated composite article capable of readily undergoing pleating according to claim 1 wherein said needle-punching was conducted at a frequency of approximately 200 to 500 penetrations per square inch.

8. An improved nonwoven laminated composite article capable of readily undergoing pleating according to claim 1 wherein said resin coated on at least the outer surface of web (a) is an acrylate resin.

9. An improved nonwoven laminated composite article capable of readily undergoing pleating according to claim 1 wherein the outer surface of web (b) additionally is lightly resin coated subsequent to said needle-punching while retaining permeability for gaseous filtration.

10. An improved nonwoven laminated composite article capable of readily undergoing pleating according to claim 1 wherein a resin was applied subsequent to said needle-punching in a total concentration of no more than 15 percent by weight based upon the total weight of the composite article.

11. An improved nonwoven laminated composite article capable of readily undergoing pleating according to claim 1 wherein the outer surface of web (a) prior to said resin coating additionally had been subjected to a heat relaxation treatment.

12. An improved nonwoven laminated composite article according to claim 1 wherein said composite article has undergone pleating through the application of heat and contact with an appropriate form without any substantial modification of its permeability to air.

13. An improved automotive depth air filter comprising a casing and having secured therein the pleated nonwoven composite article of claim 12.

14. An improved nonwoven laminated composite article capable of readily undergoing pleating to form a pleated depth gaseous filtration medium consisting essentially of:
   (a) an outer substantially fully bonded air-permeable continuous filament polyester web containing a fiber component of at least 85 mole percent polyethylene terephthalate having a denier per filament of approximately 2 to 5 and a unit weight of approximately 3 to 5 oz./yd.$^2$,
   (b) an outer substantially fully bonded air-permeable high loft polyester batt containing a fiber component of at least 85 mole percent polyethylene terephthalate and comprising a randomly-dispersed blend of crimped fibers having lengths of approximately 1 to 3 inches and having at least two different deniers wherein one of the deniers is within the range of approximately 4 to 8 and another of the deniers is within the range of approximately 12 to 18, and said web has a unit weight of approximately 1 to 4 oz./yd.$^2$, and (c) an intermediate substantially unbonded air-permeable continuous filament polyester web containing a fiber component of at least 85 mole percent of polyethylene terephthalate disposed between web (a) and batt (b) having a denier per filament of approximately 1.5 to 4 and a unit weight of approximately 0.75 to 2 oz./yd.$^2$, wherein said webs at intermittent locations are mechanically secured together in a juxtaposed surface-to-surface relationship through the use of needle-punching wherein needles having a fiber-advancing configuration have been introduced successively through batt (b), web (c), and web (a) prior to their withdrawal with the retention of substantial loft within batt (b), and at least the outer surface of web (a) was lightly resin coated subsequent to said needle-punching while retaining permeability for gaseous filtration.

15. An improved nonwoven laminated composite article capable of readily undergoing pleating according to claim 14 wherein no component capable of substantial moisture retention is present.

16. An improved nonwoven laminated composite article capable of readily undergoing pleating according to claim 14 having a thickness of approximately 75 to 115 mils and a unit weight of approximately 5 to 10 oz./yd.$^2$.

17. An improved nonwoven laminated composite article capable of readily undergoing pleating according to claim 14 having a sheet grab tensile modulus in the machine direction of approximately 60 to 100 lbs.

18. An improved nonwoven laminated composite article capable of readily undergoing pleating according to claim 14 having an air permeability of approximately 80 to 150 ft.$^3$/min./ft.$^2$ at a pressure of 0.5 inch H$_2$O.

19. An improved nonwoven laminated composite article capable of readily undergoing pleating according to claim 14 wherein said needle-punching was conducted at a frequency of approximately 250 to 350 penetrations per square inch.

20. An improved nonwoven laminated composite article capable of readily undergoing pleating according to claim 14 wherein said resin coating on at least the outer surface of web (a) is an acrylate coating.

21. An improved nonwoven laminated composite article capable of readily undergoing pleating according to claim 14 wherein the outer surface of web (b) additionally is lightly resin coated subsequent to said needle-punching while retaining permeability for gaseous filtration.

22. An improved nonwoven laminated composite article capable of readily undergoing pleating according to claim 14 wherein a resin was applied subsequent to said needle-punching in a total concentration of approximately 6 to 12 percent by weight based upon the total weight of the composite article.

23. An improved nonwoven laminated composite article capable of readily undergoing pleating according to claim 14 wherein the outer surface of web (a) prior to said resin coating additionally had been subjected to a heat relaxation step.

24. An improved nonwoven laminated composite article capable of readily undergoing pleating according to claim 23 wherein said heat relaxation step of the outer surface of web (a) is carried out by contact with a heated roll which was rotated in the direction opposite to the movement of web (a).

25. An improved nonwoven laminated composite article according to claim 14 wherein said composite has undergone pleating through the application of heat and contact with an appropriate form without any substantial modification of its permeability to air.

26. An improved automotive air filter comprising a casing and having secured therein the pleated nonwoven composite article of claim 25.

27. An improved nonwoven laminated composite article capable of readily undergoing pleating to form a stable pleated depth gaseous filtration medium consisting essentially of:

(a) an outer substantially fully bonded air-permeable continuous filament polyester web containing a fiber component of at least 85 mole percent polyethylene terephthalate having a denier per filament of approximately 4 and a unit weight of approximately 4 oz./yd.$^2$, (b) an outer resin bonded high loft polyester batt containing a fiber component of at least 85 mole percent polyethylene terephthalate and comprising a randomly-dispersed blend of crimped fibers having lengths of approximately 2 inches wherein approximately 60 percent by weight of the fibers have a denier of approximately 6 and approximately 40 percent by weight of the fibers have a denier of approximately 15, and said web has a unit weight of approximately 3 oz./yd.$^2$, and (c) an intermediate substantially unbonded air-permeable continuous filament polyester web containing a fiber component of at least 85 mole percent polyethylene terephthalate disposed between web (a) and batt (b) having a denier per filament of approximately 2.2, and a unit weight of approximately 1 oz./yd.$^2$, wherein said webs at intermittent locations are mechanically secured together in a juxtaposed surface-to-surface relationship through the use of needle-punching wherein needles having a fiber-advancing configuration have been introduced successively through batt (b), web (c), and web (a) prior to their withdrawal with the retention of substantial loft in web (b) at a frequency of approximately 275 to 325 penetrations per square inch; the outer surface web (a) following said needle-punching has been subjected to a heat relaxation step by contact with a heated roll which was rotated in the direction opposite to the movement of web (a); the outer surfaces of web (a) and batt (b) were lightly coated with an acrylate resin following said heat relaxation step wherein the acrylate resin is applied in a total concentration of 6 to 12 percent by weight based upon the total weight of the composite article while retaining permeability for gaseous filtration; and wherein no component capable of substantial moisture retention is present.

28. An improved nonwoven laminated composite article capable of readily undergoing pleating according to claim 27 having a thickness of approximately 85 to 110 mils. and a unit weight of approximately 9 oz./yd.$^2$.

29. An improved nonwoven laminated composite article capable of readily undergoing pleating according to claim 27 having a grab tensile modulus in the machine direction of approximately 60 to 100 lbs.

30. An improved nonwoven laminated composite article capable of readily undergoing pleating according to claim 27 having an air permeability of approximately 80 to 150 ft.$^3$/min./ft.$^2$ at a pressure of 0.5 inch $H_2O$.

31. An improved nonwoven laminated composite article according to claim 27 wherein said composite article has undergone pleating through the application of heat and contact with an appropriate form without any substantial modification of its permeability to air.

32. An improved automotive air filter comprising a casing and having secured therein the pleated nonwoven laminated composite article of claim 31.

33. An improved nonwoven laminated composite article capable of readily undergoing pleating according to claim 1 which exhibits a particle arrestance of at least 96 percent within the range of 1.5 to 10 microns in accordance with SAE J726 while using standard AC Fine dust.

34. An improved nonwoven laminated composite article capable of readily undergoing pleating according to claim 1 which exhibits a particle arrestance of at least 98 percent within the range of 1.5 to 10 microns in accordance with SAE J726 while using standard AC Fine dust.

35. An improved nonwoven laminated composite article capable of readily undergoing pleating according to claim 14 which exhibits a particle arrestance of at least 96 percent within the range of 1.5 to 10 microns in accordance with SAE J726 while using standard AC Fine dust.

36. An improved nonwoven laminated composite article capable of readily undergoing pleating according to claim 14 which exhibits a particle arrestance of at least 98 percent within the range of 1.5 to 10 microns in accordance with SAE J726 while using standard AC Fine dust.

37. An improved nonwoven laminated composite article capable of readily undergoing pleating according to claim 27 which exhibits a particle arrestance of at least 96 percent within the range of 1.5 to 10 microns in accordance with SAE J726 while using standard AC Fine dust.

38. An improved nonwoven laminated composite article capable of readily undergoing pleating according to claim 27 which exhibits a particle arrestance of at least 98 percent within the range of 1.5 to 10 microns in accordance with SAE J726 while using standard AC Fine dust.

* * * * *